US006857937B2

(12) United States Patent
Bajorek

(10) Patent No.: US 6,857,937 B2
(45) Date of Patent: Feb. 22, 2005

(54) LAPPING A HEAD WHILE POWERED UP TO ELIMINATE EXPANSION OF THE HEAD DUE TO HEATING

(75) Inventor: Christopher H. Bajorek, Los Gatos, CA (US)

(73) Assignee: Komag, Inc., San Jose, CA (US)

( * ) Notice: Subject to any disclaimer, the term of this patent is extended or adjusted under 35 U.S.C. 154(b) by 217 days.

(21) Appl. No.: 10/158,776

(22) Filed: May 30, 2002

(65) Prior Publication Data

US 2004/0075942 A1 Apr. 22, 2004

(51) Int. Cl.$^7$ ................................................. B24B 1/00
(52) U.S. Cl. ..................... 451/5; 451/8; 451/9; 451/11; 29/603.12; 29/603.08
(58) Field of Search ............................. 451/8, 9, 11, 5, 451/54, 55, 21, 55.8, 10, 41; 29/603.08, 603.9, 603.12, 603.16

(56) References Cited

U.S. PATENT DOCUMENTS

| | | | |
|---|---|---|---|
| 3,787,638 A | * | 1/1974 | Murai .......................... 360/112 |
| 3,821,815 A | | 6/1974 | Abbott et al. |
| 4,551,772 A | | 11/1985 | Sliger |
| 4,605,977 A | | 8/1986 | Matthews |
| 4,651,235 A | | 3/1987 | Morita et al. |
| 4,675,986 A | * | 6/1987 | Yen ............................. 29/603.1 |
| 4,777,544 A | | 10/1988 | Brown et al. |
| 4,816,932 A | | 3/1989 | Yates |
| 4,816,934 A | | 3/1989 | Tsuyuguchi |
| 4,912,883 A | * | 4/1990 | Chang et al. ................... 451/1 |
| 4,914,868 A | * | 4/1990 | Church et al. ................. 451/5 |
| 4,931,887 A | | 6/1990 | Hegde et al. |
| 5,065,483 A | * | 11/1991 | Zammit .................... 29/603.09 |
| 5,095,613 A | * | 3/1992 | Hussinger et al. ........ 29/603.17 |
| 5,113,300 A | | 5/1992 | Ikeda et al. |
| 5,175,938 A | * | 1/1993 | Smith ........................... 33/567 |
| 5,203,119 A | * | 4/1993 | Cole ............................ 451/11 |
| 5,214,589 A | * | 5/1993 | Tang ........................... 700/117 |
| 5,321,882 A | * | 6/1994 | Zarouri et al. ........... 29/603.07 |
| 5,361,547 A | * | 11/1994 | Church et al. ................. 451/5 |
| 5,403,457 A | * | 4/1995 | Nago et al. .............. 204/192.2 |
| 5,408,365 A | | 4/1995 | Van Doorn et al. |

(List continued on next page.)

OTHER PUBLICATIONS

K. Babcock et al., "Automated Measurement of Pole Tip Recession with New–Generation Atomic Force Microscopes", Nov. 8, 2000, Datatech, www.veeco.com/pdf/PTR-Main.pdfpp. 155–160.

Dr. K. Gilleo et al., "Materials and Processes for MR and GMR Heads and Assemblies", www.cookonsemi.com/staystik.htm, pp 1–10.

Primary Examiner—George Nguyen
(74) Attorney, Agent, or Firm—Silicon Valley Patent Group LLP

(57) ABSTRACT

A head is fabricated using photolithography, and the head is purposely powered up during a material removal process, such as lapping, so that the head's expansion (that would be formed on being powered up during normal usage in a drive) is planarized. Specifically, the head is energized in a manner identical (or similar) to energization of circuitry in the head during normal operation in a drive, even though fabrication of the head has not yet been completed. When energized, a shape that the head would have during normal operation is replicated (or approximated). Therefore, the head's shape includes a expansion of the pole tip region, although the head is only partially fabricated. Thereafter, a portion of the head in the expansion is partially or completely removed, by lapping while energized. The depth of material removal from the head is monitored e.g. by a controller sensitive to a change in electrical characteristic of a device (such as a resistor) that is normally fabricated during photolithography of the head.

37 Claims, 9 Drawing Sheets

U.S. PATENT DOCUMENTS

| | | | |
|---|---|---|---|
| 5,561,896 A | * 10/1996 | Voegeli et al. | ............ 29/603.08 |
| 5,588,199 A | 12/1996 | Krounbi et al. | |
| 5,591,073 A | 1/1997 | Turgeon | |
| 5,591,533 A | * 1/1997 | Pinarbasi | .................... 428/611 |
| 5,632,669 A | * 5/1997 | Azarian et al. | ................ 451/54 |
| 5,668,676 A | 9/1997 | Voorman et al. | |
| 5,772,493 A | * 6/1998 | Rottmayer et al. | ............. 451/5 |
| 5,790,336 A | 8/1998 | Voorman et al. | |
| 5,978,163 A | 11/1999 | Cunningham | |
| 5,991,113 A | 11/1999 | Meyer et al. | |
| 5,993,566 A | * 11/1999 | Lin | ............................ 148/108 |
| 6,057,975 A | 5/2000 | Yaeger et al. | |
| 6,064,261 A | 5/2000 | Stein et al. | |
| 6,072,671 A | 6/2000 | Gill | |
| 6,074,566 A | 6/2000 | Hsiao et al. | |
| 6,093,083 A | 7/2000 | Lackey | |
| 6,131,271 A | 10/2000 | Fontana, Jr. et al. | |
| 6,188,531 B1 | 2/2001 | Chang et al. | |
| 6,193,584 B1 | * 2/2001 | Rudy et al. | .................... 451/5 |
| 6,226,149 B1 | 5/2001 | Dill, Jr. et al. | |
| 6,249,393 B1 | 6/2001 | Billings et al. | |
| 6,262,858 B1 | 7/2001 | Sugiyama et al. | |
| 6,269,425 B1 | 7/2001 | Mounes-Toussi et al. | |
| 6,287,170 B1 | * 9/2001 | Hao et al. | ...................... 451/5 |
| 6,295,580 B1 | 9/2001 | Sturges et al. | |
| 6,311,212 B1 | 10/2001 | Chong et al. | |
| 6,349,363 B2 | 2/2002 | Cai et al. | |
| 6,366,416 B1 | 4/2002 | Meyer et al. | |
| 6,384,994 B1 | 5/2002 | Smith et al. | |
| 6,452,735 B1 | 9/2002 | Egan et al. | |
| 6,473,258 B1 | 10/2002 | Shitara et al. | |
| 6,473,259 B1 | 10/2002 | Kuo et al. | |
| 6,493,183 B1 | 12/2002 | Kasiraj et al. | |
| 6,501,606 B2 | 12/2002 | Boutaghou et al. | |
| 6,504,666 B1 | 1/2003 | Patti et al. | |
| 6,609,948 B1 | * 8/2003 | Fontana, Jr. et al. | ............. 451/5 |
| 6,709,321 B2 | * 3/2004 | Ishizaki et al. | ............. 451/364 |
| 2001/0036028 A1 | 11/2001 | Putnam et al. | |

\* cited by examiner

LAPPING A HEAD WHILE POWERED UP TO ELIMINATE EXPANSION OF THE HEAD DUE TO HEATING

BACKGROUND OF THE INVENTION

Expansion of materials at the micrometer scale and nanometer scale is important in data storage devices such as magnetic tape and disk drives. Specifically, such devices contain a small device called a "slider" on which is located a "head". The slider moves relative to a recording medium (such as a tape or disk) during normal operation. The head contains circuitry (called "transducer") to perform the functions of reading from and writing to a recording medium 120. A conventional head 110 (FIG. 1A) includes a microscopic region 111 at which the transducer is located. Head 110 may be either separately fabricated and attached to a slider 130, or integrally formed as a portion of slider 130. Slider 130 is formed primarily of a ceramic material, and head 110 is located at a trailing edge 131 thereof (FIG. 1A). Slider 130 typically has an air bearing surface (ABS) 133 facing the recording medium 120.

In certain disk drives, or tape drives, region 111 is separated from surface 121 (of recording medium 120) during normal operation by a distance called flying height (in a direction perpendicular to surface 121). Typical flying heights are designed to insure appropriate magnetic spacing between the transducer and the medium (e.g. in the range of 40–75 angstroms) and depend on the amount of heat generated in region 111. In region 111, head 110 can be made of heterogeneous materials, which have different thermal coefficients of expansion, and expand by different amounts. Depending on the magnitude of expansion and the location of head 110 relative to slider 130, a portion of the head in and around region 111 may expand (e.g. swell) outward (e.g. by 25 to 120 Angstroms) towards the recording medium 120 as illustrated in FIG. 1B. When the head's surface expands and bulges out (from its normally planar shape when powered down), the fly height is reduced by the amount of this expansion. The reduction in fly height is sufficient to cause the head to come into contact with the medium, resulting in the head itself or the recording medium or both being damaged. For example, a head-to-disk current surge may occur suddenly when a head comes into close proximity to a disk. When such a current surge happens, read/write circuitry in the head may melt, thereby damaging the head permanently. Damage to the head can also occur by mechanical abrasion, e.g. when a head's protrusion acts as a phonograph needle. Contact of a head with the medium may also affect the drive's servo control (PES, position error signal), resulting in the head becoming unable to track the medium so that data cannot be written or read.

A prior art head may be heated via a resistor as described in U.S. Pat. No. 5,991,113 granted to Meyer, et al. on Nov. 23, 1999, and entitled "Slider with temperature responsive transducer positioning". Specifically, a temperature control circuit, coupled to a strip of thermally expansive material or to a resistance heating element on the slider, employs a variable current source to control the slider temperature and transducer displacement. Nominal slider operating temperatures can be set to achieve a predetermined transducer flying height, to compensate for variations in flying heights among batch fabricated sliders. Optionally, a temperature sensor can be employed to measure slider operating temperatures and provide a temperature sensitive input to the temperature control circuit. U.S. Pat. No. 5,991,113 is incorporated by reference herein in its entirety.

Also, a prior art head may have a pole tip recession (PTR), as noted in an application note ("appnote") dated Nov. 8, 2000, entitled "Automated Measurement of Pole Tip Recession with New-Generation Atomic Force Microscopes" available over the Internet at www.veeco.com/pdf/PTRMain.pdf. This appnote states in pertinent part: "Recession is produced during lapping of slider rows during manufacture, when the hard ceramic $Al_2O_3$—TiC of the slider's ABS wears less than the softer NiFe pole tips. PTR contributes to the total magnetic spacing between the transducers and the magnetic layer of the disk, and is becoming a more significant portion of that spacing as flying heights shrink. . . . Manufacturers are seeking to reduce the PTR to <5 nanometers, to optimize performance, while maintaining a slight recession to allow for thermal expansion and to prevent damage in the event of contact with the disk."

Lapping of slider rows (also called "strips") is also described in, for example, U.S. Pat. No. 5,095,613 granted to Hussinger et al, U.S. Pat. No. 5,361,547 granted to Church, et al., U.S. Pat. No. 4,914,868 also granted to Church, et al. and U.S. Pat. No. 4,912,883 granted to Chang, et al. each of which is incorporated by reference herein in its entirety. For more information on fabrication of magnetic recording heads, see an article entitled "Materials and Processes for MR and GMR Heads and Assemblies" by Dr. K. Gilleo, N. Kerrick and G. Nichols, available on the Internet at www.cooksonsemi.com/staystik.htm, and this article is incorporated by reference herein in its entirety. Note that instead of lapping a row of sliders, a strip having heads aligned in a column can be lapped, as described in U.S. Pat. No. 5,321,882 granted to Zarouri, et al. on Jun. 21, 1994 that is also incorporated by reference herein in its entirety.

A change in a signal from a resistor or other device (also called "electrical lapping guide") on each head may be monitored during lapping of the head, to determine when to stop lapping, as described in, for example U.S. Pat. No. 4,914,868 (incorporated by reference above), and in the following each of which is incorporated by reference herein in its entirety: U.S. Pat. No. 3,821,815 granted to Abbott et al. (which discloses electrical monitoring of films during material removal), U.S. Pat. No. 3,787,638 granted to Murai (which discloses a Hall element with one or more leads used during head manufacture to measure the amount of material being ground away), U.S. Pat. No. 4,675,986 granted to Yen (which discloses electrical lapping devices having graded resistance), U.S. Pat. No. 5,175,938 granted to Smith (which teaches combining different types of graded resistors), and U.S. Pat. No. 5,065,483 granted to Zammit (which teaches comparing a resistive lapping guide with a finished lapping guide).

U.S. Pat. No. 5,632,669 granted to Azarian, et al. on May 27, 1997, and entitled "Interactive method for lapping transducers" describes a lapping body that communicates with a transducer with a type of signal that the transducer is designed to read and/or write. Thus for lapping a magnetic head or slider to be employed in a hard disk drive, the lapping body contains a magnetic medium layer that is either prerecorded or written by the head during lapping, while the signal received by the head is monitored and analyzed by a processor in order to determine, in part, when to terminate lapping. A series of transducers can be simultaneously lapped while individually monitored, so that each transducer can be removed from the lapping body individually upon receipt of a signal indicating that transducer has been lapped an optimal amount. Transducers for employment in drive systems can also be tested for performance characteristics by utilizing lapping bodies having surface characteristics similar to those found in the drive system. U.S. Pat. No. 5,632,669 is also incorporated by reference herein in its entirety.

SUMMARY OF THE INVENTION

In accordance with the invention, a head is fabricated using photolithography, and one or more circuits in the head are purposely powered up during a material removal process, such as lapping, so that the head's expansion (that would be formed on being powered up during normal usage in a drive) is planarized. Specifically, the head is energized in a manner identical (or similar) to energization of circuitry in the head during normal operation in a drive, even though fabrication of the head has not yet been completed. When energized, a shape that the head would have during normal operation is replicated (or approximated). Therefore, the head's shape includes an expansion of the pole tip region, although the head is only partially fabricated. Thereafter, a portion of the head in the expansion is partially or completely removed, by lapping while energized. The depth of material removal from the head is monitored e.g. by a controller sensitive to a change in electrical characteristic of a device (such as a resistor) that is normally fabricated during photolithography of the head.

In several embodiments, although energized, the head is not used for reading data from or writing data to a recording medium simultaneously with the material removal process, which is contrary to the teachings of U.S. Pat. No. 5,632,669 granted to Azarian, et al. Instead, a head is tested (for its read/write efficacy) in accordance with the invention, only after the material removal process has been completed, and in some embodiments only after the head has been completely fabricated. If at that stage a head fails testing, then that head is discarded. Moreover, in certain embodiments, a number of heads in a strip are lapped together as a group, while being powered up, so that each head's expansion is simultaneously planarized with other heads. Lapping an entire strip of heads while being powered up is neither disclosed nor suggested by U.S. Pat. No. 5,632,669. Powered-up lapping of a strip of heads as described herein provides economies of scale and manufacturing efficiency not possible by use of the methods and apparatuses of U.S. Pat. No. 5,632,669.

In several of the drawings, the dimensions are not to scale. Specifically, vertical shrinkage or expansion are shown highly exaggerated relative to the horizontal dimensions to illustrate certain aspects of the invention. For example, in FIGS. 3A–3D, FIGS. 4A and 4B, the x axis scale is shown a few orders of magnitude (e.g. 10,000 times) smaller than the y axis scale

DETAILED DESCRIPTION

Figure 1A:
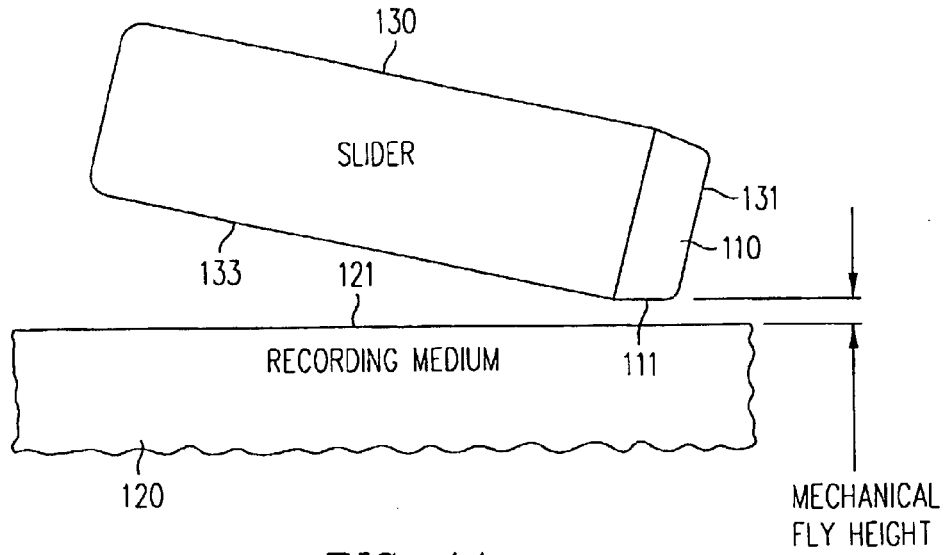
FIGS. 1A and 1B illustrate, in a side view, a prior art drive including a head and a recording medium, prior to and subsequent to power up of the head.
Figure 1B:
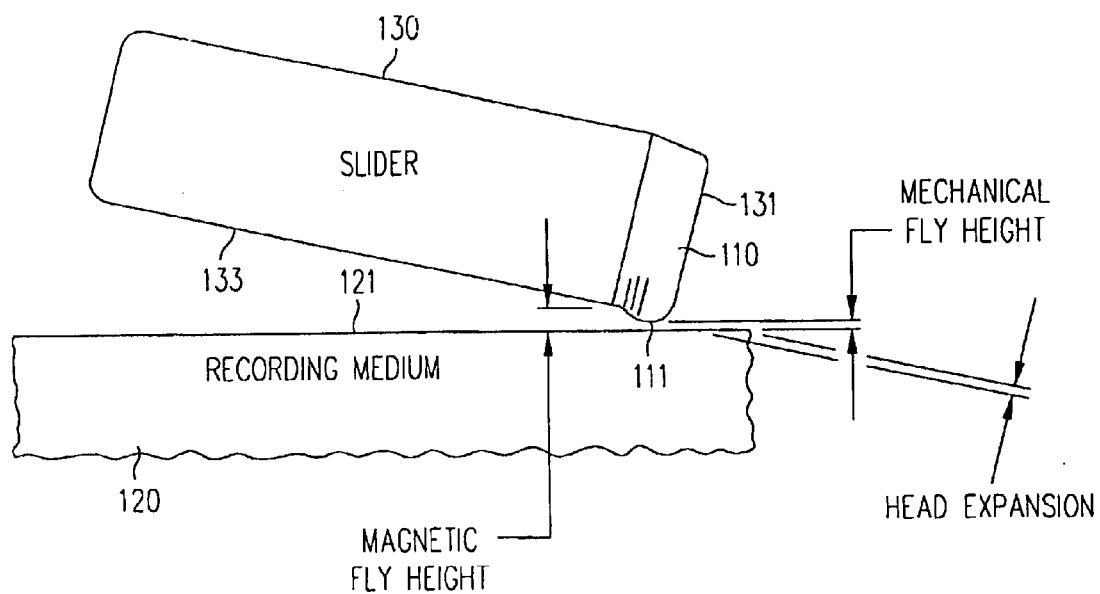
Figure 2A:
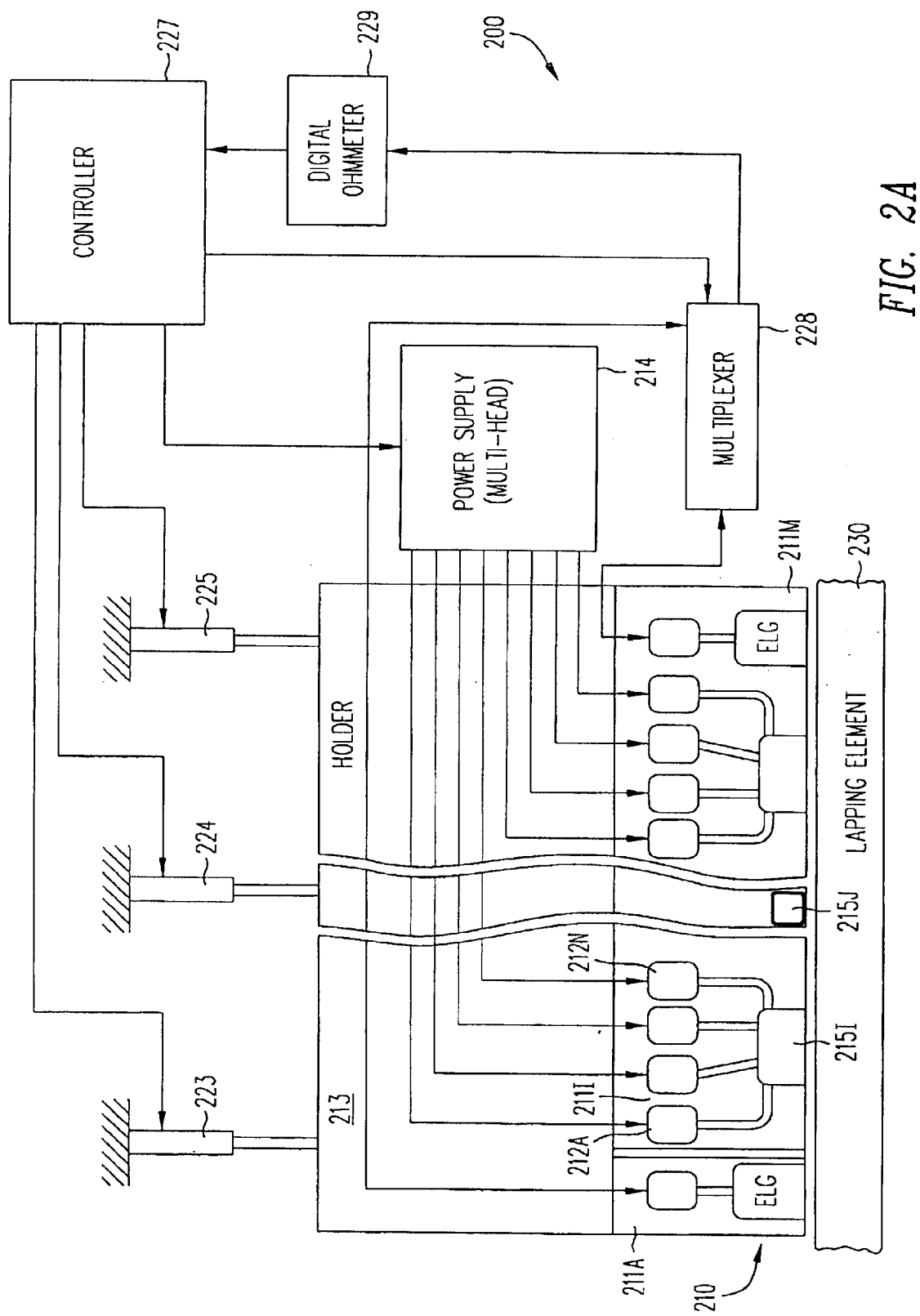
FIGS. 2A and 2B illustrate, in a block diagram and a flow chart respectively, lapping of a strip of heads while being powered up in accordance with the invention.

In one embodiment, a head 211I (FIG. 2A) for a drive (such as a tape drive or a disk drive) is manufactured by photolithography (as per act 251 in FIG. 2B) to have formed thereon a transducer 215I (FIG. 2A) coupled to a number of terminals 212A–212N (FIG. 2A). Depending on the implementation, the photolithography can take 50–100 steps. Transducer 215I may include a magnetoresistive (MR) read element 301 (see FIG. 3A), and optionally a thin film inductive write element and/or copper coils 302 (FIG. 3A). Copper coils 302 are coiled around pole pieces in any manner well known in the art.

Although certain specific features of one particular example of a head 211I are described herein, any type of head can be powered up during lapping as described herein. Examples of head that can be powered up include Magneto Resistive (MR), Giant Magneto Resistive (GMR), Tunnel Magneto Resistive (TMR), and Current Perpendicular to Plane Magneto Resistive (CPPMR).

Depending on the embodiment, one or more electrical lapping guides are formed at the same time that transducer 215I (FIG. 2A) is formed, i.e. during photolithography. For example, one electrical lapping guide (ELG) may be deposited at each end of the row of transducers. The electrical lapping guides are used to control lapping (as discussed below).

Head 211I is just one of a large number of heads (e.g. 10,000 heads) that are manufactured on a wafer 250 (FIG. 2C), and depending on the embodiment, the wafer may be cut into strips, with each strip 251 representing a row (or column) of wafer 250. Each strip 210 includes a number of heads 211A–211M that are located side by side, one after another in a successive manner.

After photolithography, head 211I (which may still be part of a strip 210 as shown in FIG. 2A) is fastened to a holder 213 (as per act 252 in FIG. 2B), and holder 213 to facilitate precise process handling. Holder 213 in turn is mounted in system 200 (FIG. 2A), opposite to a lapping element 230 which performs lapping: removes and polishes material on head 211I to create an air bearing surface (ABS). Specifically, in the exemplary system 200 illustrated in FIG. 2A, actuators 223–225 push holder 213 and head 211I against lapping element 230, although other mechanisms may be used in other embodiments.

Lapping element 230 has an abrasive surface, which due to motion relative to head 211I while pressure is applied by actuators 223–225, removes material from an air bearing surface of head 211I. In this manner, head 211I is lapped, to remove material therefrom, such that the throat height 308 and/or the stripe height 309 of a MR read transducer in head 211I is precisely located relative to the air bearing surface. Lapping element 230 can be, for example, a disk, a drum or a tape, depending on the implementation.

At some point prior to (or even during) the lapping process, terminals 212A–212N are connected to a power supply 214 that supplies power thereto. The amount and type of power supplied by power supply 214 is similar (and preferably identical) to the power used by head 211I during normal operation in a drive. The power supplied may include, for example, a current $I_{write}$ that is normally applied for writing data to a recording medium and/or another current $I_{read}$ that is normally applied for reading data from the recording medium.

The amount and type of power Pp that is applied by power supply 214 to each terminal of a head during the fabrication in a production environment is predetermined (prior to fabrication), based on operating conditions of the drive in which the head is to be mounted. Specifically, during lapping, at least two different high-frequency currents $I_{read}$ and $I_{write}$ are applied to two terminals of head 211I, to ensure that heat generated during normal operation when mounted in a drive is also generated when head 211I is powered up during lapping. The current $I_{read}$ dissipates power into head 211I during reading which is proportional to $I_{read}^2 R_{read}$, where $R_{read}$ is the resistance of the magneto-resistor read element. And similarly, current $I_{write}$ dissipates power into head 211I during writing which is proportional to $I_{write}^2 R_{write}$, where $R_{write}$ is the resistance of the copper coil.

Therefore, each of the read transducer and the write transducer in a head of the type described herein has a complex impedance Z which includes a "real" component and an "imaginary" component. The real component of Z models a portion of the transducer that dissipates heat (hereinafter "dissipative portion") and the imaginary component of Z models a reactive portion (which does not dissipate heat). During lapping of a head, it is only necessary to recreate the expansion of the head due to heat dissipation.

Specifically, in some embodiments, only the write transducer (e.g. copper coils 302 that are coiled around pole pieces) are powered up, while in other embodiments only the read transducer (e.g. the MR element) is powered up. Moreover, in certain embodiments, only direct current (DC) is applied to either (or both) of the two transducers, while in other embodiments only time-varying current (i.e. having a magnitude that varies with time and that can be decomposed into one or more periodic waveforms) is applied to either (or both) of the two transducers. The DC current that is applied may be greater than or equal to the root mean square (rms) value of the power that is applied during normal operation in a drive. Instead of or in addition to power applied to the two transducers, power (either DC or time-varying current) may be applied to circuitry (hereinafter "dummy" element) that is inactive during normal operation in a drive (which may be either a disk drive or a tape drive).

Depending on the embodiment, one or more dummy elements 305A and 305B (FIG. 3A) may be included in a head of the type described herein, solely to power up the head during lapping. The location and rating of elements 305A and/or 305B, as well as the power applied thereto may be designed in certain embodiments to replicate the shape of the head during normal operation in a drive. Note that dummy elements 305A and 305B may be used in combination with one or more transducers, e.g. element 305A may be powered up with the write transducer during lapping, thereby to reduce or even eliminate the power applied to the read transducer during lapping (which may be damaged when powered up to normal operation level current).

Several exemplary embodiments the power applied to a head during lapping are described in the following table, which is not an exhaustive list but merely exemplary.

| Rating | Read Current | Write Current | Advantage/Disadvantage |
| --- | --- | --- | --- |
| Theoretically best | AC waveforms | AC waveforms | Risk of damaging read element when energized to normal operational level if current flows to lapping element |
| Equivalent to above | DC equivalent to AC | AC waveforms | Same risk as above |
| Equivalent to above | AC waveforms | DC equivalent to AC | Same risk as above |
| Equivalent to above | DC equivalent to AC | DC equivalent to AC | Same risk as above |
| Next best to above | No power | AC waveforms | No risk of damage to read element; negligible difference in thermal expansion of head |
| Next best to above | No power | DC equivalent to AC | No risk of damage to read element; negligible difference in thermal expansion of head |
| Next best to above | No power | No power | Power up dummy element; no risk; thermal expansion may differ depending on dummy element design, location and power |
| Next best to above | DC or AC waveforms | No power | Risk of damaging read element |

In certain embodiments, both currents $I_{read}$ and $I_{write}$ (that are used in normal operation in a drive) are applied to head 211I during lapping, because during normal operation there may be an overlap in the read and write operations, e.g. if there is a read immediately after a write, in which case both currents will be present. In addition, heat generated by eddy currents may be identified as a function f of these two currents: $f(I_{write}+I_{read}) R_{eddy}$. So, there are three sources of heat during normal operation, and each of these three sources also generate power P during lapping in one specific embodiment, same as in the normal manner of operation in a drive:

$$P = I_{read}^2 R_{read} + I_{write}^2 R_{write} + f(I_{write}+I_{read}) R_{eddy}.$$

Figure 3A:
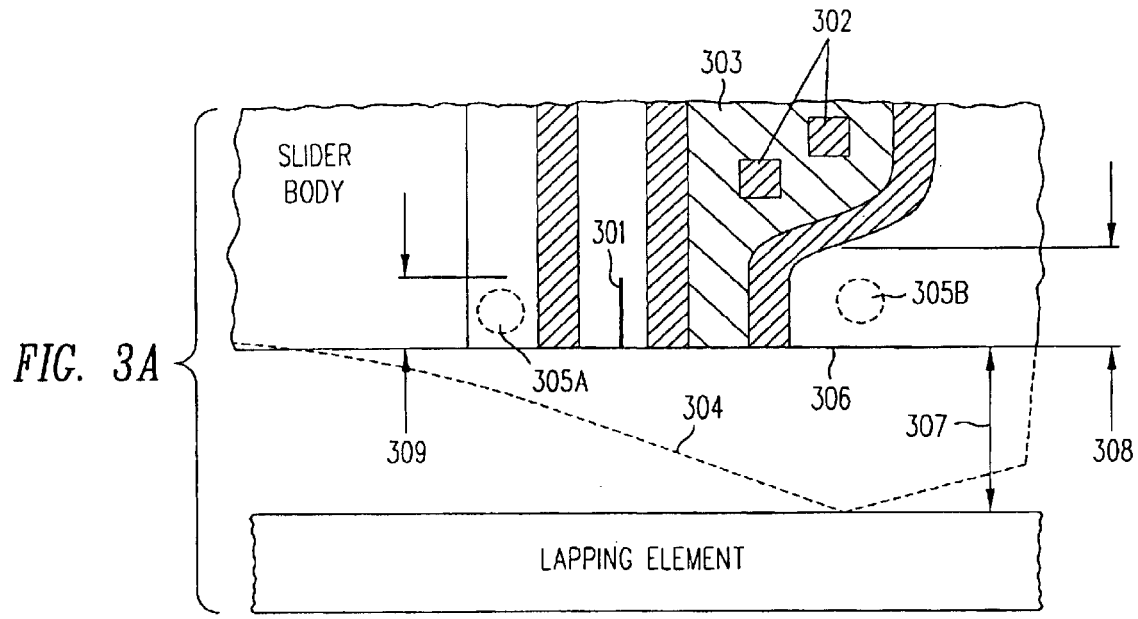
FIGS. 3A–3D illustrate, in side views, change in shape of a head during lapping of the type illustrated in FIGS. 2A and 2B.
Figure 3B:
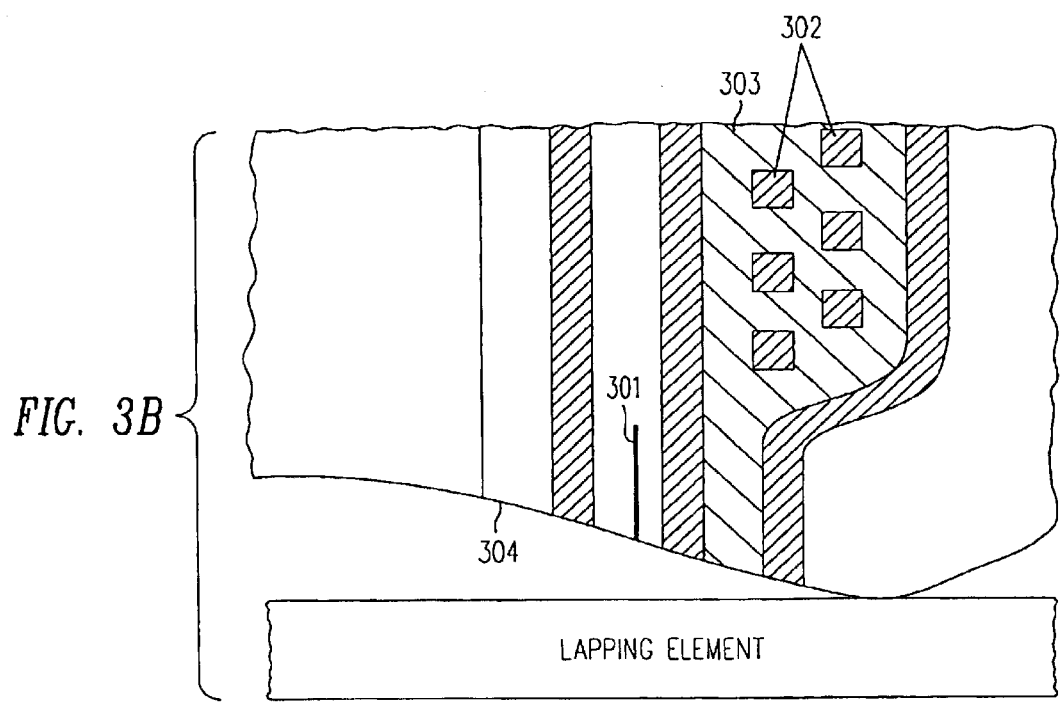
Figure 3C:
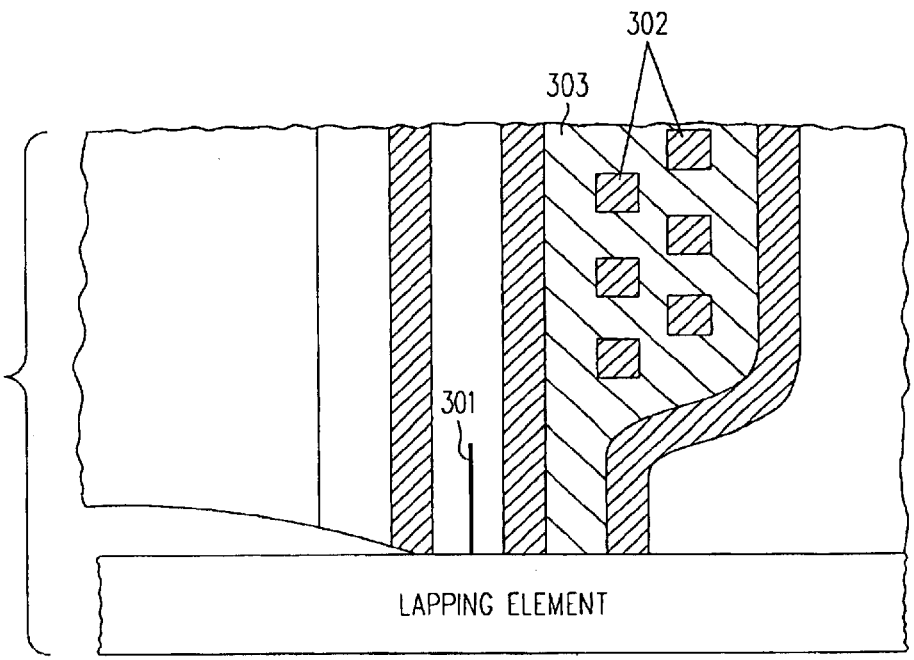
Figure 3D:
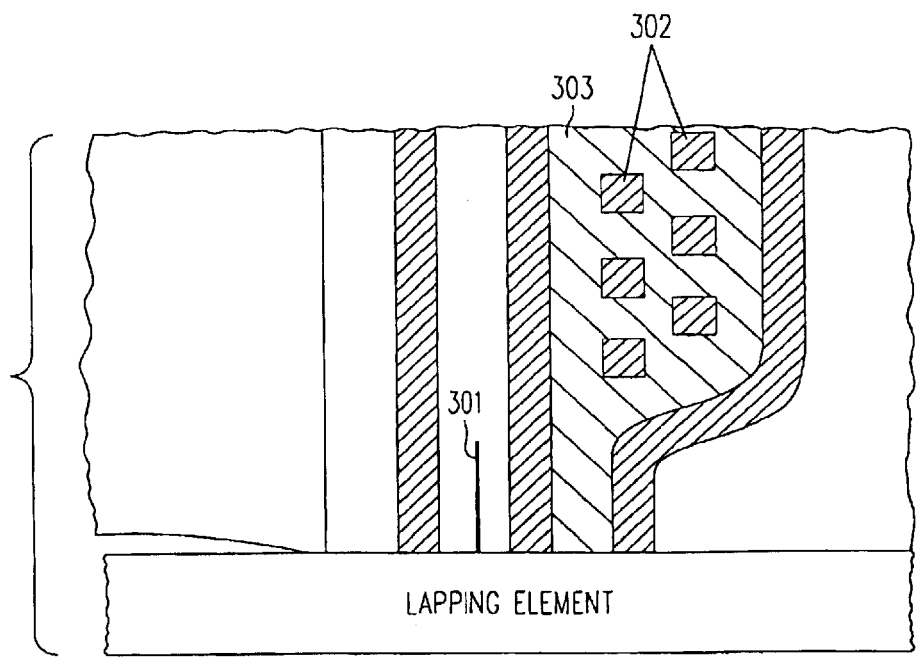

When energized in this manner, a shape 304 (FIG. 3A) that head 211I would have during normal operation when installed in a drive is replicated (or approximated), including expansion by a distance 307 at a location that is adjacent to (but slightly offset from) the pole tip region. The respective shapes 306 and 307 prior to and subsequent to power up are illustrated in FIGS. 3A and 3B. Next, the head's expansion (by distance 307 as shown in FIG. 3A) is either partially (FIG. 3C) or completely removed (FIG. 3D), by lapping while head 211I is kept energized.

Note that lapping by system 200 is performed under the same conditions or similar conditions as operation of a head in a drive. For example, if the expected disk operating temperatures is about 55 degrees centigrade, then system 200 is also operated at this temperature. Alternatively, the amount of power applied to each head 211I may be increased (beyond the power used in normal operation in a drive) to raise the temperature thereof to the operating temperature in a disk drive.

Therefore, a head is purposely kept powered up during material removal in accordance with the invention, so that the head's expansion is planarized. The depth of total material removal from head 211I to achieve a specific MR read element height or write element throat height is monitored in the conventional manner in some embodiments e.g. by a controller 227 that is sensitive to a change in electrical characteristic (such as resistance) of one or more electrical lapping guides (ELGs) that are coupled via a multiplexer 228 to a sensor 229. Sensor 229 can be, for example, an ohm-meter that supplies an electrical signal to controller 227, indicative of an electrical characteristic (e.g. resistance) of one of the electrical lapping guides (ELGs). In several such embodiments, the ELG is not used to monitor removal of head expansion.

Controller 227 selects an ELG by driving an appropriate control signal to multiplexer 228, e.g. in a time-division-multiplexed manner, as would be apparent to the skilled artisan. In one embodiment, controller 227 uses different values of a signal from sensor 229 to control actuators 223–225 to keep the strip 210 level, by varying the pressure applied by each actuator. Therefore, by controlling the individual actuators, a bow condition of a strip can be corrected, in the conventional manner.

As noted above, electrical lapping guides (ELGs) on a strip 210 are fabricated simultaneously with fabrication of transducers 215I and 215J, during photolithography. Depending on the embodiment, strip 210 may have one electrical lapping guide (ELG) for each transducer (located adjacent thereto, between two successive transducers), or alternatively just two electrical lapping guides (ELGs) may be formed at the two ends of a row of transducers. Depending on the embodiment, ELGs may be used for stopping both rough lapping and fine lapping or just one of these.

In several embodiments, although energized, head 211I is not used for reading or writing during the lapping process, and lapping element 230 does not contain a magnetic material. This is contrary to the teachings of U.S. Pat. No. 5,632,669 granted to Azarian, et al. Head 211I is tested for its read/write efficacy only after the lapping process has been completed.

Completion of the lapping process is determined in any conventional manner (e.g. via ELGs). For example, a background resistance within head 211I can be monitored during lapping, by energizing the read element, and measuring a signal from the read element. The measured signal is monitored to detect a change in background resistance within head 211I. Therefore, the signal measured during lapping is unrelated to the readback signal from a disk (as described in U.S. Pat. No. 5,632,669). Instead a change in the measured signal is due to a change in the electrical characteristic of the MR element itself.

In some embodiments, as soon as (or shortly before) lapping of head 211I is to be stopped (e.g. as indicated by a change in resistance of a corresponding electrical lapping guide), only this head 211I is powered down. On being powered down, this head 211I cools (relative to the remaining heads), and its pole tip region starts contracting, thereby to stop or reduce the lapping effect, while the remaining heads (that are still powered up) continue to be lapped. Powering down of a head 211I to stop the lapping effect can be instead of or in addition to controller 227 controlling an appropriate one of actuators 223–225 to stop applying pressure. Eventually, when all heads 211A–211M have been lapped, the entire strip 210 is withdrawn from lapping element 230, and all heads are powered down.

In certain embodiments, after completion of the lapping process, strip 210 is powered down, and any remaining process operations that are normally performed in the fabrication of a head are performed, in the normal manner. For example, a protective layer (of carbon in several embodiments) may be coated to ensure protection from corrosion or abrasion of circuit elements that have exposed regions, and/or from the medium or from harsh environmental conditions, followed by creation of air bearing structures, such as a self regulating surface of the type well known in the art. Depending on the embodiment, various structures that inhibit stiction (such as protrusions or pads) may also be formed on each head (e.g. of strip 210). Thereafter strip 210 is diced (if not already previously diced).

Figure 4A:
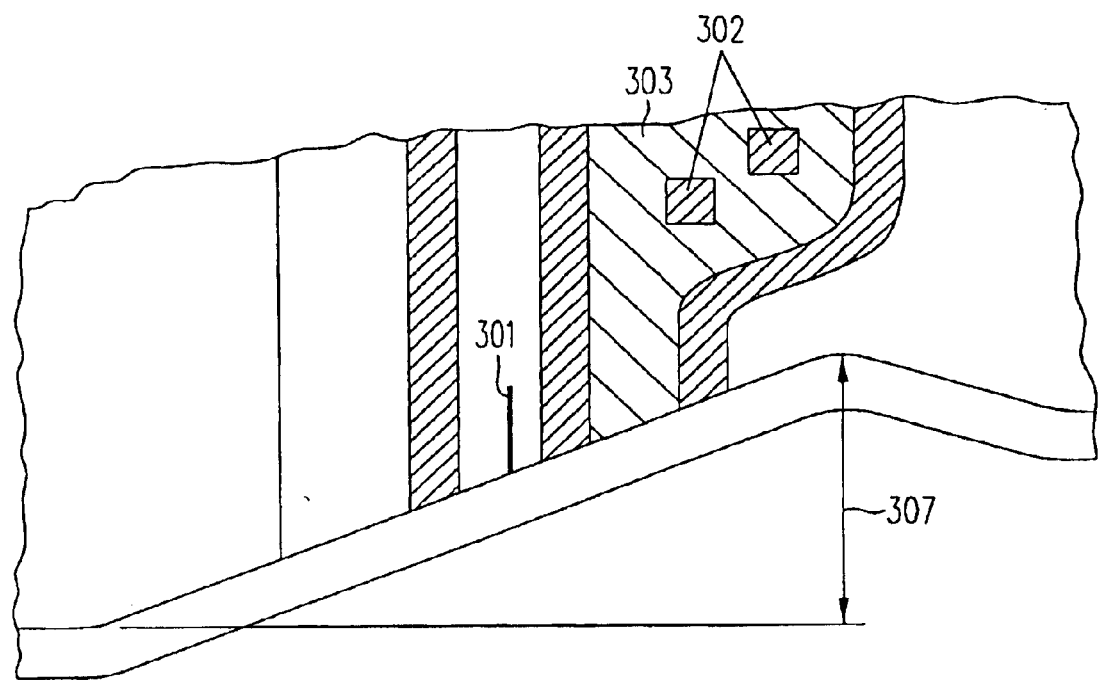
FIGS. 4A and 4B illustrate, in side views, change in shape of a expansion-planarized head prior to and subsequent to being powered up.
Figure 4B:
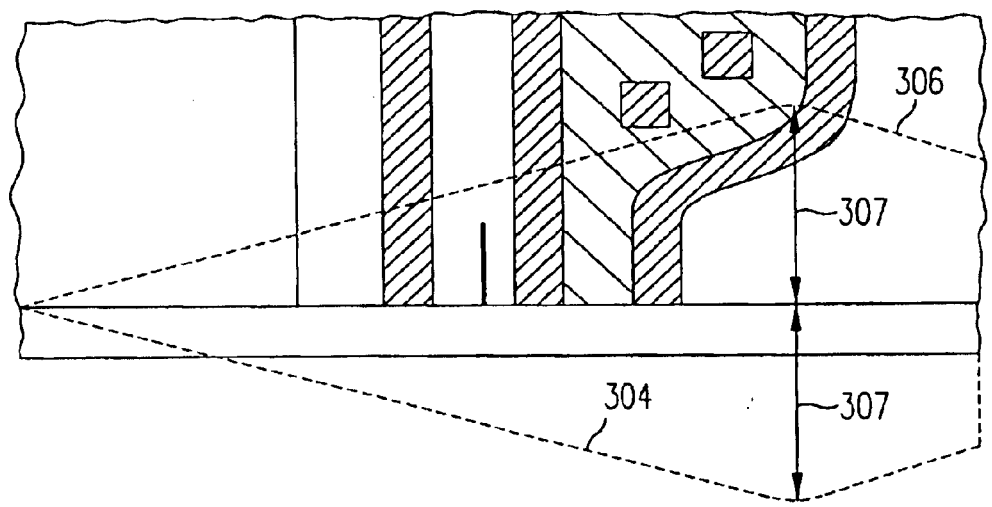

After being powered down and on being cooled to room temperature, head 211I has a concave shape (FIG. 4A) in the pole tip region that is inverse of (i.e. a mirror image of) the convex shape of a head's expansion. Specifically, the concavity defines a volume that would have been occupied by material that forms the head expansion, and that has been removed by lapping. Thereafter, whenever head 211I is powered up in future, the pole tip region becomes substantially flat and in-line with an air bearing surface which is identical to the shape of head 211I on completion of the lapping process (FIG. 4B).

The specific profile of the air bearing surface of head 211I (when powered up in a drive) may be other than flat, depending on the embodiment. For example, even when designed to be flat, manufacturing tolerances result in heads that fall within a range around the flat surface. Consequently, heads resulting from the fabrication that are in the middle of the range may have a flat surface, while other heads at one end of the range have a convex surface and still other heads at the other end of the range have a concave surface. In certain embodiments, the entire range is moved outward (made more convex) so that most (or almost all heads) have a convex surface. In some such embodiments, the power applied to the heads during lapping is selected to ensure that the maximum expansion of heads is less convex than for heads that are lapped without being powered up during lapping.

Figure 2B:
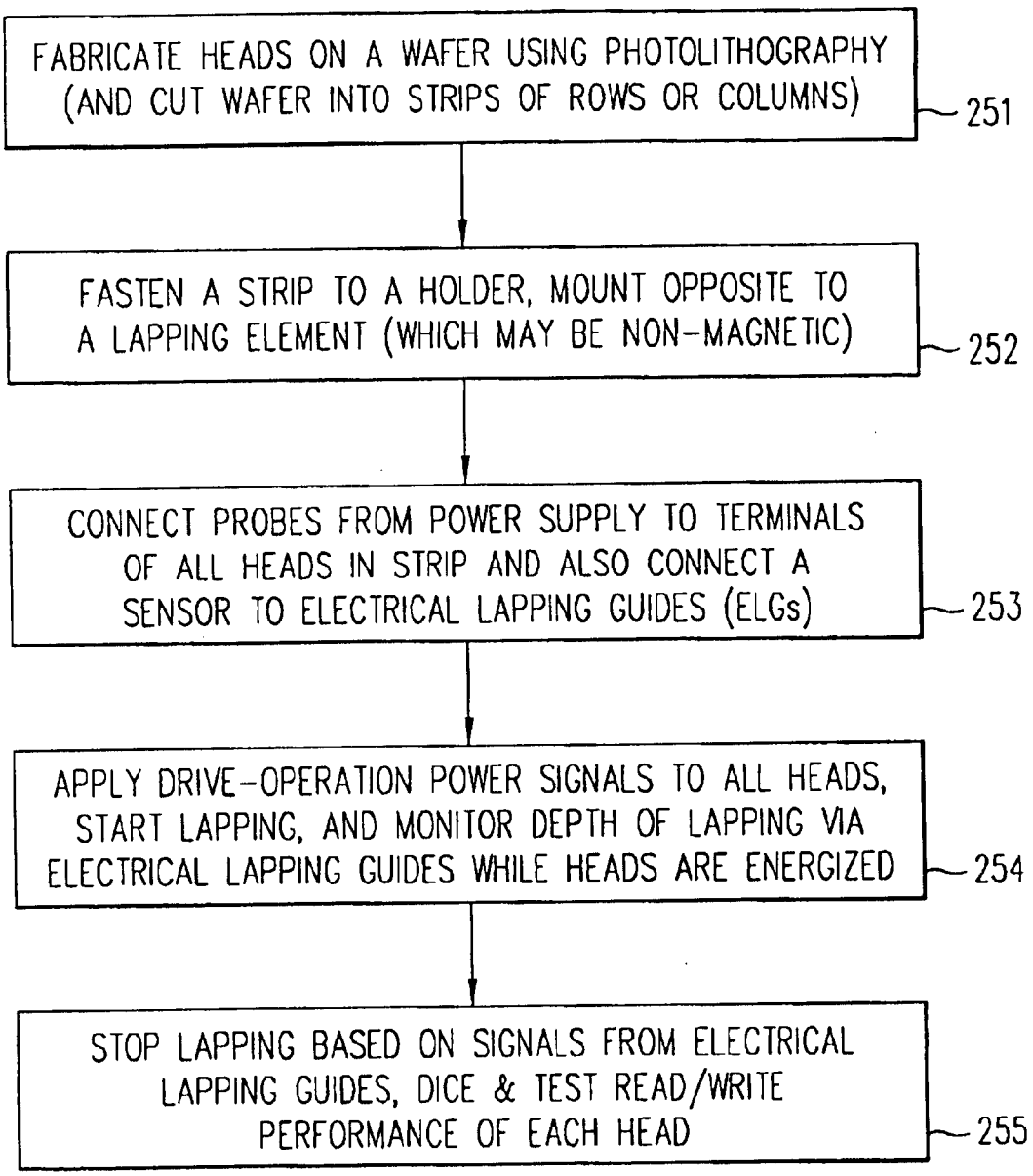
Figure 2C:
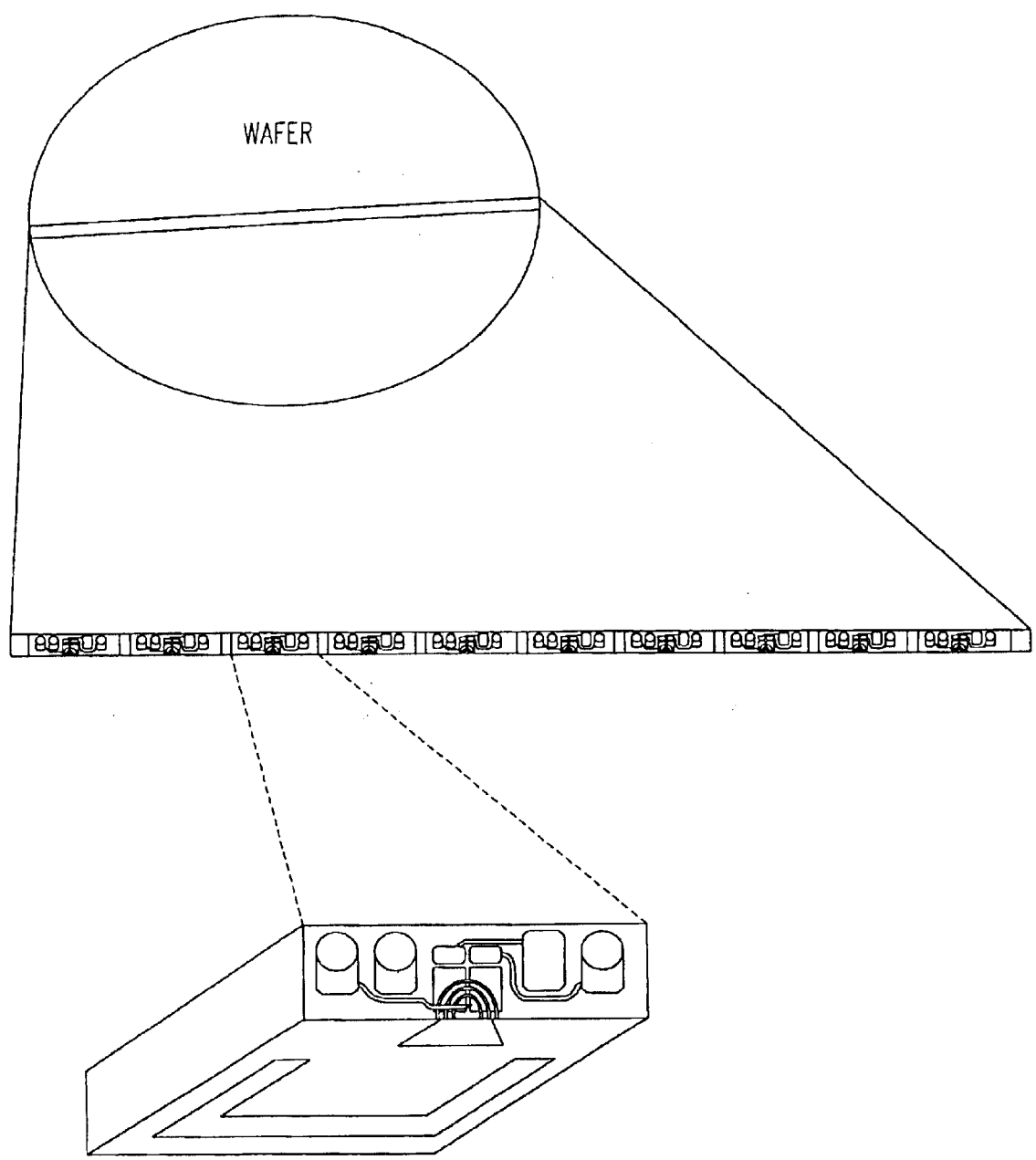
FIG. 2C illustrates a strip of heads in an elevation view and a single head in a perspective view, manufactured by photolithography before being lapped as illustrated in FIGS. 2A and 2B.
Figure 4C:
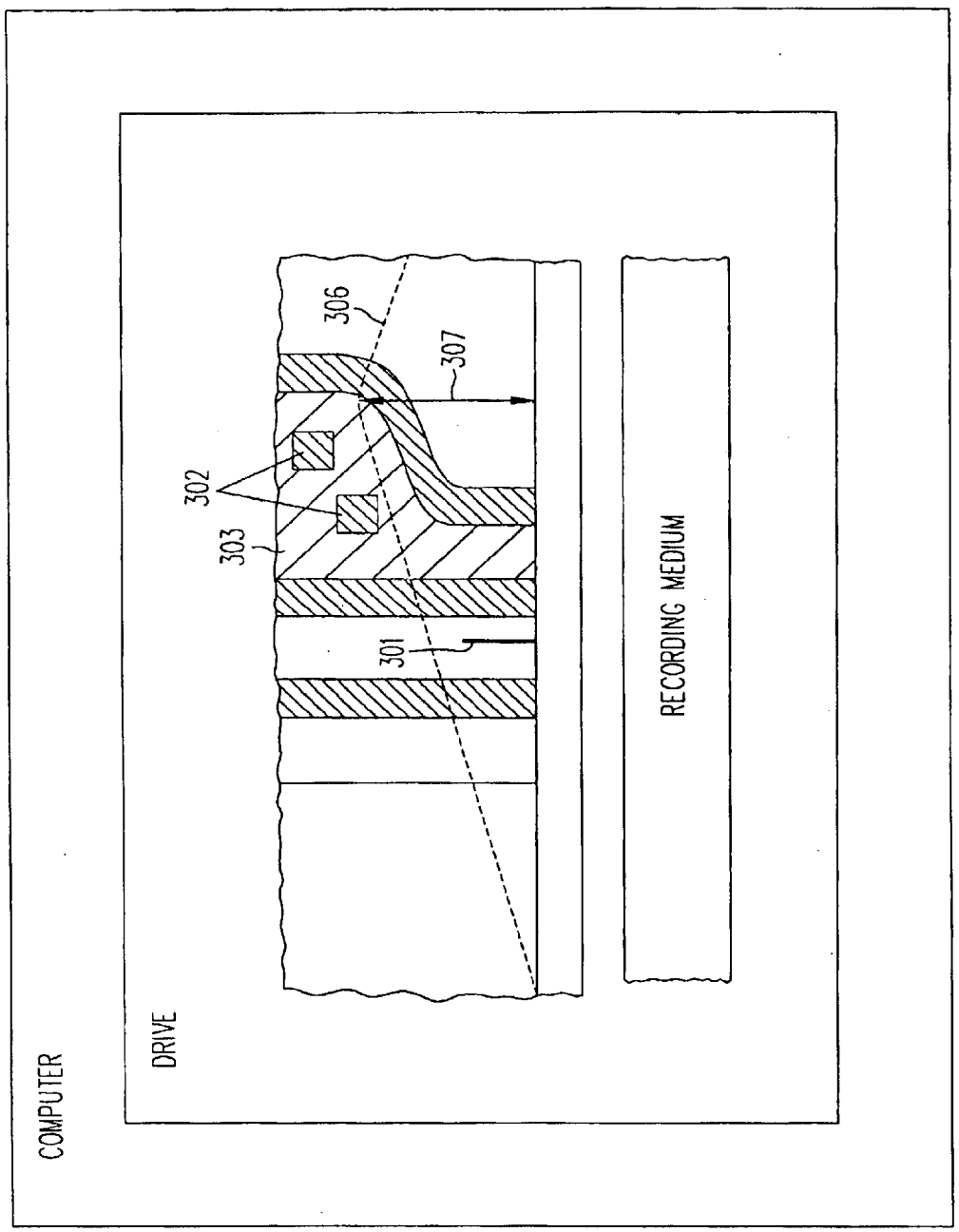
FIG. 4C illustrates use of the expansion-planarized head of FIG. 4B to write and read signals from a recording medium when installed in a drive in a computer.

After lapping, head 211I is mounted in a head gimbal assembly (HGA) and tested in the normal manner (as indicated by act 255 in FIG. 2B). The testing may be for efficacy of reading and writing, and any conventional methods may be used to determine e.g. overwrite, bit-shift, and signal to noise ratio. If head 211I fails conventional testing, then head 211I is discarded, and alternatively if it passes then head 211I is mounted in a head arm assembly (HAA) for use in a drive (for example disk drive) as illustrated in FIG. 4C. Depending on the embodiment, head 211I may (after passing the tests) be used in a tape drive instead of a disk drive. In certain embodiments, head 211I is mounted in a storage device for use with a recording medium, and the storage device (such as a drive) itself is mounted in a computer (as per FIG. 4C). Note that in several embodiments, head 211I has a concave surface 306 (FIG. 4C), and when it expands due to heating the resulting fly height is smaller than prior art fly heights (which may be constrained by a prior art head's expansion from a substantially flat surface to a bulging surface similar to surface 304 shown in FIG. 4B).

One distinction over U.S. Pat. No. 5,632,669 is that in certain embodiments, a number of heads 211A–211M (wherein $A \leq I \leq M$, and M is the total number of heads in strip 210, e.g. 100 heads) while still being integral portions of a strip are lapped together as a group, while being powered up. Lapping an entire strip of heads (as a group) provides manufacturing efficiency and economies of scale of the type not possible in lapping each head individually. Furthermore, "strip lapping" embodiments of the type just described are backward compatible, in the sense that pre-existing systems and methods that are currently in use for non-energized strips can still be used in accordance with the invention with the following modifications: installing a power supply, connecting the power supply to all terminals of each head in the strip, and providing power thereto. In contrast the method disclosed by U.S. Pat. No. 5,632,669 requires new tooling.

Figure 5A:
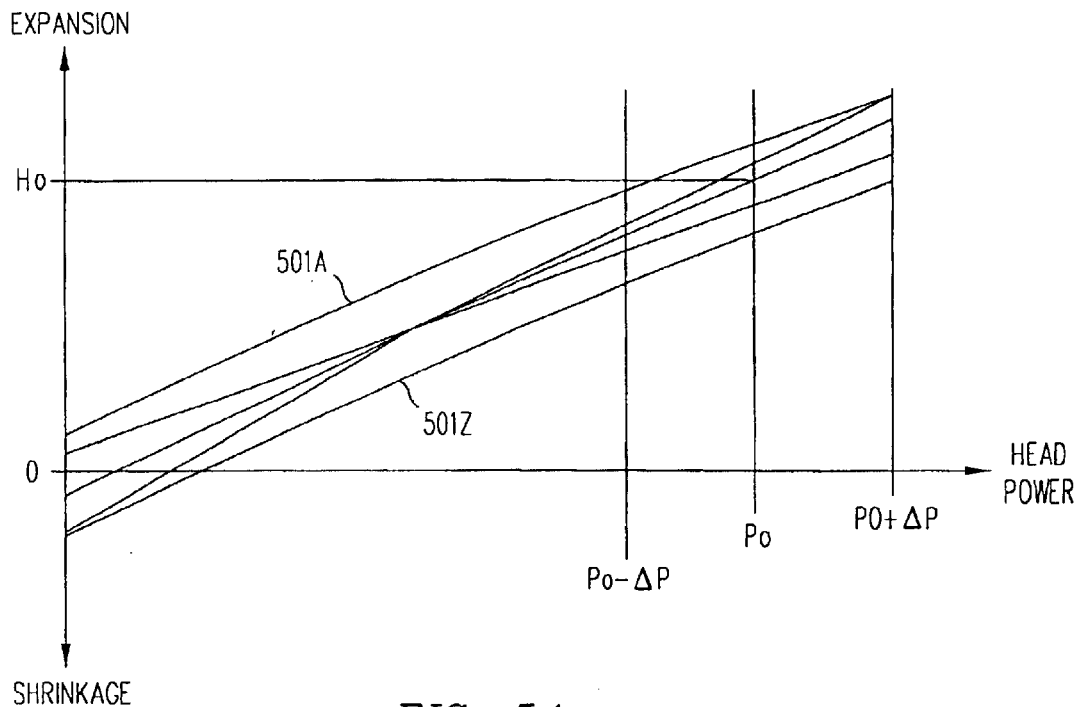
FIGS. 5A and 5B illustrate, in graphs, the change in expansion of a head as a function of power applied to the head (wherein distance Ho along the y axis may be, for example, on the order of 50 angstroms).

When designing a new head (of a next generation), it is decided that fly height is to be reduced by an amount Ho. In such a case, as can be seen in FIG. 5A, this head must be operated at a power level Po in order to provide the desired magnetic performance. In the next generation head, the head is to be polished (or otherwise machined) while powered up, and therefore, it is possible for the fly height to be reduced by an amount same as (or in the same order of magnitude as) the reduction in fly height due to expansion.

Note that the power on the x axis in FIG. 5A is for a predetermined optimal magnetic performance, which involves tradeoffs between one or more factors such as the following: (a) ability to thoroughly overwrite new data over old data, with minimum residual signal from the old data; (b) achieve a minimum soft error rate in handling data at the desired linear bit density while the head is centered on the track; (c) limit the maximum write current to minimize side writing by the head which, if excessive, will broaden the data track width and hence limit the track density capability of the head-disk combination; (d) limit the maximum write current to minimize effects such as pulse broadening or non linear transition shift, which if excessive could limit the linear bit density or soft error rate achievable with the head-disk combination; and (e) limit the maximum sense and write currents to avoid excessive head heating which could limit head lifetime due to electromigration failure. Each head manufacturer may use its own criterion for selecting a desired magnetic performance.

Both currents $I_{read}$ and $I_{write}$ (of the type described above) to be applied to a next generation of heads during lapping are predetermined in one embodiment, prior to lapping, by experimentation as follows. Initially, when designing a next generation head, a nominal value for process power Pp that is to be applied during lapping is determined based on experience with heads used so far (and which were fabricated (specifically, lapped) without being powered up). Specifically, the amount of expansion of each of several heads of a current generation is determined (e.g. using a metrology tool such as an atomic force microscope) as a function of power P applied during normal operation, and the response may be plotted in graphs 501A–501ZI (see FIG. 5A). For example, a current $I_{read}$ of 5 mA, and a current $I_{write}$ of 40 mA are applied to a current generation head (that operates at a fly height of 75 angstroms), and these current values form the power P shown in FIG. 5A (as per the above-discussed formula). The value of power P is varied by ΔP of various amounts to obtain the graphs 501A–501Z. As illustrated in FIG. 5A, when no power is applied the average head does not have a recession or a expansion, in the current generation of heads.

Note that in some embodiments, optimization of magnetic performance may also depend on other factors such as a specific recording channel: the electronics (read preamplifier and write driver) to produce and receive electrical signals, as well as a specific head-to-disk spacing (fly height). This optimization may be done in the context of achieving a predetermined disk data capacity which in turn is dependent on achieving a specific bit areal density (product of linear bit and track densities).

To determine the head power to be used during the manufacture of heads, one or more strips of heads (also called "test heads") are lapped while powered up, using the selected values of either or both currents $I_{read}$ and $I_{write}$ that generate power Po. During lapping of a number of test heads, one or more test heads are powered at the nominal power value Po, while others are powered at powers in a range ΔP around Po. After lapping, fabrication of test heads in the one or more strips is completed in the normal manner (e.g. passivation), and the strip(s) are diced, followed by mounting of each test head on a suspension.

Thereafter, magnetic performance of each test is characterized based on the factors (a)–(e) discussed above, during operation in a drive (which can be either a tape drive or a disk drive). Next, a metrology tool is used to measure the expansion of each test head when powered at Po. From the magnetic performance and the expansion measurement, the optimal power to be used during lapping is determined to be Pp: preferably the power Pp is selected to yield zero expansion when the test head is powered up at that power, and yet provide the desired magnetic performance. If necessary, the just-described power Pp is used as the power Po for another iteration of the above-described acts while lapping one or more additional strips of test heads, until the desired magnetic performance is achieved.

Figure 5B:
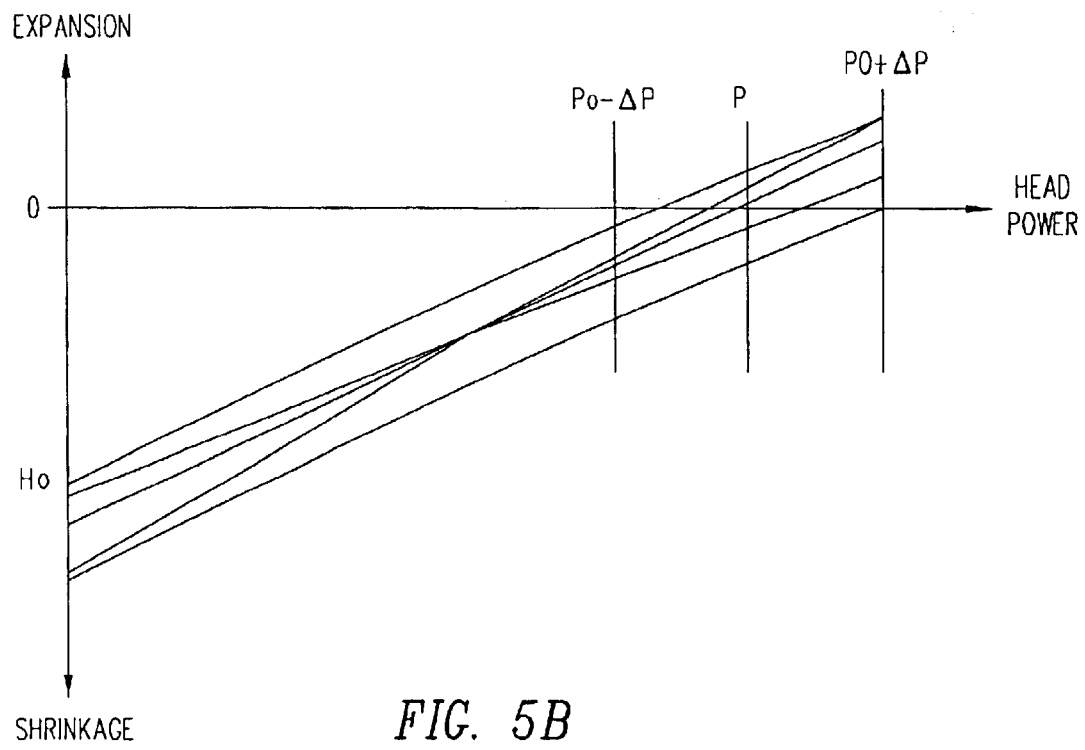

Thereafter, the power Pp is used as a predetermined value, during fabrication of the next generation heads (also called "second generation heads") in a production environment, to power all heads in a strip to the same power level Pp while lapping. All second generation heads fabricated in this manner may be used in a drive in the normal manner (subject to being tested in the normal manner). When such a second generation head is powered down, it has a concave surface in the pole tip region (as illustrated in FIG. 5B), and when powered up, the second generation head has a substantially flat surface in the pole tip region.

Energization of a second generation head during lapping as described herein ensures that even microscopic distortions of the head that are unique to head are planarized during the fabrication process, thereby to avoid deformation of the head from the planar shape during normal operation in a drive. Such a second generation head eliminates failures caused by head expansion of the type described above, thereby to facilitate smaller fly heights (and higher data storage densities) than in the prior art.

Moreover, applying normal operation power to a second generation head during fabrication eliminates any issues of electro-migration related failures that would be otherwise likely if a bias current is applied. Furthermore, applying power to the head itself to heat the pole tip region eliminates the need for an additional separate heating element of the type described in U.S. Pat. No. 5,991,113.

Note that the above-described process to fabricate second generation heads can be repeated, with the second generation heads as the starting point to create (i.e. to provide data for) another generation of heads (also called "third generation") that are even more planar during normal operation in a drive.

Numerous modifications and adaptations of the embodiments described herein will be apparent to the skilled artisan in view of the disclosure. For example, the powering down of an individual head 211I as described above can be performed during either kind of lapping operation: lapping of an entire strip, or lapping of each head individually, depending on the embodiment.

Also, a strip of heads that is lapped while energized as described herein can be either a row or a column of a wafer, depending on the embodiment.

Furthermore, although the above description refers to lapping, any other process (such as chemical mechanical polishing) may be used to remove a bulge (caused by heating) from an energized head.

In some embodiments, although heads 211A–211M of a strip 210 are powered up, they are not used for reading or writing data during lapping as described herein. Such embodiments have the advantage of using conventional lapping elements, thereby eliminating the need for a magnetic lapping body of the type required by U.S. Pat. No. 5,632,669.

However, in several embodiments, the energized heads are used for reading and/or writing during lapping, in the manner described in U.S. Pat. No. 5,632,669. These embodiments distinguish over U.S. Pat. No. 5,632,669 for at least the following reason: an entire strip of heads is powered up and lapped (i.e. without dicing until after lapping is completed).

In several embodiments, a strip of heads is diced, and after physical separation of all heads from one another, each head is individually lapped while powered up. Individual lapping of each head while energized can be done simultaneously with individual lapping of one or more other heads, e.g. in a manner similar to U.S. Pat. No. 5,632,669. A distinction of such embodiments over U.S. Pat. No. 5,632,669 has been mentioned above: a lapping body need not contain magnetic material. In such embodiments, as soon as a head's individualized lapping is to be stopped, that particular head is removed from a lapping element (in a manner similar to U.S. Pat. No. 5,632,669), while remaining heads continue to be lapped.

In certain embodiments, a lapping element does contain magnetic material in a manner similar to U.S. Pat. No. 5,632,669. At least one distinction of such embodiments over U.S. Pat. No. 5,632,669 is that a signal read by the head from the magnetic material is not monitored to determine when to stop lapping. Instead, any method well known in the art for stopping the lapping of non-energized heads can be used to determine when to stop lapping of an energized head (e.g. by measuring a change in resistance during lapping). For this reason, when some embodiments of heads are powered up (e.g. in a storage device), they have surfaces other than flat but within a predetermined range around a flat surface.

Furthermore, although in certain embodiments, lapping is stopped based on signals from electrical lapping guides, in other embodiments, other signals (such as a signal from a MR element) are taken into account in determining when lapping is to be stopped.

Moreover, although several of the embodiments described above use a head 211I as a flying head in a disk drive, heads for contact recording can also be lapped in the manner described herein, i.e. while being energized in the manner similar or identical to energization during normal operation in a drive.

Although in some embodiments, a number of test heads are fabricated simultaneously, in other embodiments, test heads are fabricated successively, one after another, with current levels required by a preceding test head to write data being used during energized lapping of a next test head, until a difference in current levels and/or a difference in planarization between two successive test heads falls below a predetermined threshold (which may be, for example, same as a manufacturing tolerance).

Moreover, as would be apparent to the skilled artisan in view of the disclosure, heads of the type described herein can be used for any type of recording, such as longitudinal recording or perpendicular recording.

Furthermore, although in certain embodiments the same power is applied to all heads in a strip during lapping, in other embodiments different power is applied to each head, depending on the characteristics of each head that may have been measured prior to lapping. For example, in such embodiments, there is apriori information on various properties of the read transducer and/or the write transducer of each head being manufactured in a wafer, such as read sensor length and photoresist thickness. This information is maintained even after the wafer has been cut into multiple strips of heads, and used while each strip is being lapped, to apply different currents to different heads and/or to terminate the application of power to different heads at different times.

Numerous such modifications and adaptations of the embodiments described herein are encompassed by the attached claims.

What is claimed is:

1. A method for manufacturing a head to be used in a drive, the method comprising:

powering up a head;

removing material from the head while powered up; and monitoring the amount of material removal based at least on a change in electrical characteristic of an electrical lapping guide (ELG), by passing current through the ELG;

wherein the head is powered up by passing current through any element which is not another ELG.

2. The method of claim 1 further comprising:

stopping material removal based at least in part on said change in characteristic.

3. The method of claim 2 wherein:

said head is not used for reading a signal from a recording medium during material removal; and material removal stoppage is not based on said signal read from said recording medium.

4. The method of claim 2 further comprising:

testing reading or writing performance of said head after stopping material removal.

5. The method of claim 1 wherein:

the head is an integral portion of a strip of heads;

during said powering up, each head in the strip is powered up; and during said material removal, each head in the strip is lapped.

6. The method of claim 5 further comprising:

forming a carbon overcoat subsequent to lapping; and dicing the strip subsequent to forming the carbon overcoat.

7. The method of claim 5 further comprising:

testing read performance of each head in the strip subsequent to lapping; and rejecting any head that fails said testing.

8. The method of claim 1 wherein:

said monitoring provides a negligible amount of power to said device.

9. A head resulting from performing the acts of claim 1 followed by application of a protective layer.

10. A drive that comprises the head of claim 9.

11. A computer that comprises the drive of claim 10.

12. The drive of claim 10 wherein the drive is a disk drive.

13. The drive of claim 10 wherein the drive is a tape drive.

14. The method of claim 1 wherein:

said any element is a write element.

15. The method of claim 1 wherein:
said any element is a read element.
16. The method of claim 1 wherein:
said any element is a dummy element.
17. A method for manufacturing a head to be used in a drive, the method comprising:
fabricating a head using photolithography;
powering up the head;
removing material from the head while powered up; and
monitoring the amount of material removal based at least on a change in electrical characteristic of a device fabricated by said photolithography;
wherein said powering up provides a fixed amount of power related to power to be used during normal operation in said drive, to cause expansion that would normally be caused during normal operation in said drive.
18. The method of claim 17 further comprising:
determining the fixed amount of power, prior to fabricating said head, by trial and error on at least one test head.
19. A system for lapping a head to be used in a drive, the system comprising:
an ohm-meter couplable to an electrical lapping guide formed by photolithography simultaneously with the head; and
a power supply couplable to the head, to provide to the head, a predetermined amount of power related to power to be used for reading from or writing to a magnetic medium during normal operation in said drive.
20. The system of claim 19 further comprising:
a controller comprising a conductive line coupled to the ohm-meter to receive a signal therefrom.
21. The system of claim 20 wherein:
the controller comprises another line coupled to the power supply to provide a control signal thereto.
22. The system of claim 21 wherein:
the circuitry comprises a plurality of power terminals, and the power supply is couplable to each power terminal; and
the electrical lapping guide comprises an additional power terminal, and the power supply is couplable to said additional power terminal, and the ohm-meter is couplable to another terminal of the electrical lapping guide.
23. The system of claim 19 further comprising:
a holder comprising a plurality of conductive lines, including at least one conductive line coupled between the ohm-meter and the head, and another conductive line coupled between the power supply and the head.
24. A method for manufacturing heads, the method comprising:
powering up a partially fabricated head; and
removing material from the partially fabricated head while powered up without sensing a signal from the partially fabricated head that is read from a recording medium, during said removing;
wherein only direct current (DC) is used in the powering up.
25. A method for manufacturing heads, the method comprising:
powering up a partially fabricated head; and
removing material from the partially fabricated head while powered up without sensing a signal from the partially fabricated head that is read from a recording medium, during said removing;
wherein the powering up comprises applying power to only a read transducer in the partially fabricated head.
26. A method for manufacturing heads, the method comprising:
powering up a partially fabricated head; and
removing material from the partially fabricated head while powered up during said removing;
wherein the powering up comprises applying power to only a write transducer in the partially fabricated head.
27. A method for manufacturing heads, the method comprising:
powering up a partially fabricated head; and
removing material from the partially fabricated head while powered up during said removing;
wherein the powering up comprises applying power to at least a dummy element in the partially fabricated head.
28. A method for manufacturing a head, the method comprising:
powering up at least one of (a read transducer and a write transducer) of the head;
lapping the head while powered up; and
using an electrical lapping guide to terminate said lapping.
29. The method of claim 28 wherein:
both transducers are powered up, while the head is being lapped.
30. The method of claim 29 further comprising:
measuring a signal from the read transducer to detect a change in resistance within the head.
31. The method of claim 28 further comprising:
powering up a dummy element within the head, while the head is being lapped.
32. The method of claim 28 wherein:
the head is one of a plurality of heads located side by side, one after another in a successive manner in a strip; and
at least one transducer in each head in the strip is powered up during lapping.
33. The method of claim 32 wherein:
the strip comprises a plurality of electrical lapping guides; and
the method comprises using a signal from at least one of the electrical lapping guides to stop lapping.
34. A method for manufacturing a head, the method comprising:
powering up at least one of (a read transducer and a write transducer) of the head; and
lapping the head while powered up, using a lapping element that does not contain a magnetic material.
35. The method of claim 34 wherein:
said lapping is stopped in response to a signal from an electrical lapping guide.
36. A method for manufacturing a head, the method comprising:
powering up at least one of (a read transducer and a write transducer) of the head;
lapping the head while powered up; and
testing the head for read/write efficacy only after completion of said lapping.
37. The method of claim 36 wherein:
said lapping is stopped in response to a signal from an electrical lapping guide.

* * * * *